(12) United States Patent
Staufer

(10) Patent No.: US 12,339,004 B2
(45) Date of Patent: Jun. 24, 2025

(54) NOZZLE ASSEMBLY WITH NOZZLE HEAD HAVING GUIDE ELEMENT

(71) Applicant: Rolls-Royce Deutschland Ltd & Co KG, Blankenfelde-Mahlow (DE)

(72) Inventor: Max Staufer, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 1 day.

(21) Appl. No.: 18/154,347

(22) Filed: Jan. 13, 2023

(65) Prior Publication Data

US 2023/0235886 A1 Jul. 27, 2023

(30) Foreign Application Priority Data

Jan. 24, 2022 (DE) ...................... 10 2022 101 588.2

(51) Int. Cl.
*F23R 3/28* (2006.01)
*F23R 3/14* (2006.01)
(52) U.S. Cl.
CPC ............... *F23R 3/286* (2013.01); *F23R 3/14* (2013.01); *F23R 3/283* (2013.01)
(58) Field of Classification Search
CPC .... F23R 3/12; F23R 3/14; F23R 3/283; F23R 3/286; F23R 3/10; F23R 3/00; F23R 3/26; F23R 3/18; F23R 3/20; F02C 3/22
See application file for complete search history.

(56) References Cited

U.S. PATENT DOCUMENTS

| | | |
|---|---|---|
| 3,790,086 A | 2/1974 | Masai |
| 4,261,517 A | 4/1981 | Hopkins et al. |
| 5,228,283 A | 7/1993 | Sciocchetti |
| 8,375,548 B2 | 2/2013 | Stastny et al. |
| 2005/0241319 A1* | 11/2005 | Graves ............ F23D 11/107 60/776 |
| 2005/0279862 A1 | 12/2005 | Mao et al. |

(Continued)

FOREIGN PATENT DOCUMENTS

DE 102010016702 A1 11/2010

OTHER PUBLICATIONS

German Search Report dated Aug. 1, 2022 from counterpart German Patent Application No. 102022101588.2.

*Primary Examiner* — Devon C Kramer
*Assistant Examiner* — Jingchen Liu
(74) *Attorney, Agent, or Firm* — SHUTTLEWORTH & INGERSOLL, PLC; Timothy J. Klima

(57) ABSTRACT

The proposed solution relates to a nozzle assembly for a combustion chamber of an engine, having at least one nozzle, which includes a nozzle head that extends along a nozzle longitudinal axis and has at least one nozzle exit opening for injecting fuel into a combustion space of the combustion chamber, and at least one air-guiding duct, by way of which a swirl-affected air flow can be created in the direction of the combustion space along an outer lateral surface of the nozzle head.

At least one guide element which protrudes on the outer lateral surface of the nozzle head is in a flow path for the air flow of the at least one air-guiding duct and is configured to guide at least a part of the air flow radially inwards in relation to the nozzle longitudinal axis into a central injection region downstream of the nozzle exit opening.

8 Claims, 7 Drawing Sheets

(56) References Cited

U.S. PATENT DOCUMENTS

| | | |
|---|---|---|
| 2008/0054101 A1 | 3/2008 | Prociw et al. |
| 2010/0095677 A1* | 4/2010 | Dawson .................. F23R 3/343 60/752 |
| 2014/0246518 A1 | 9/2014 | Myers |

* cited by examiner

NOZZLE ASSEMBLY WITH NOZZLE HEAD HAVING GUIDE ELEMENT

This application claims priority to German Patent Application 10 2022 101 588.2 filed Jan. 24, 2022, the entirety of which is incorporated by reference herein.

The invention relates to a nozzle assembly having a nozzle for a combustion chamber of an engine for the purpose of providing a fuel-air mixture at a nozzle exit opening of the nozzle.

A nozzle for a combustion chamber of an engine, in particular for an annular combustion chamber of a gas turbine engine, comprises a nozzle head, having the nozzle exit opening, and a nozzle main body, which has at least one fuel-guiding duct for conveying fuel to the nozzle head. Multiple nozzles are for example combined in one combustion-chamber assembly, which comprises multiple nozzles that are arranged adjacent to one another, commonly along a circular line, and are intended for introducing fuel into the combustion chamber.

Typically, multiple (at least two) air-guiding ducts for delivering air to be mixed with the fuel are provided in the region of a nozzle head of a nozzle. By way of the air-guiding ducts, air flows for the air to be mixed with the fuel are created, which are directed radially inwards in relation to a direction of extent of the nozzle main body and an injection direction of the fuel. These air flows usually lead to the input of swirled air and thus to the production of eddy currents and thus a recirculation zone at the nozzle exit opening, which is necessary for flame stability.

Already in conjunction with atomizer nozzles or airblast atomizers, however, it can sometimes be observed that, via the recirculation zone, a backflow of hot gases in the central region behind the nozzle can also occur. The hot gases conveyed thereby in the direction of the nozzle exit opening and the combustion products entrained in the process can lead to overheating at the nozzle head and thus to destruction of the nozzle head.

Against this background, the proposed solution is based on the object of providing a nozzle assembly that is improved in this regard.

This object is achieved by a nozzle assembly according to claim 1.

Accordingly, what is proposed is a nozzle assembly for a combustion chamber of an engine, which nozzle assembly comprises at least one (atomizer) nozzle, which comprises a nozzle head that extends along a nozzle longitudinal axis and has at least one nozzle exit opening for injecting fuel into a combustion space of the combustion chamber. Also provided is at least one air-guiding duct, by way of which a swirl-affected air flow can be created in the direction of the combustion space along an outer lateral surface of the nozzle head. At least one protruding guide element is provided on the outer lateral surface of the nozzle head, which guide element is in a flow path for the air flow of the at least one air-guiding duct and is configured to guide at least a part of the air flow radially inwards in relation to the nozzle longitudinal axis into a central injection region downstream of the nozzle exit opening.

By way of the nozzle, a primary, or central, nozzle head is thus provided with a nozzle exit opening for injecting atomized fuel into a combustion space of the combustion chamber. By means of the at least one air-guiding duct, and downstream of the nozzle exit opening, the atomized fuel discharged from the nozzle exit opening is then combined with a swirl-affected (combustion) air flow from the at least one air-guiding duct, with the result that a recirculation zone for a fuel-air mixture is created downstream of the nozzle head and the nozzle exit opening. In this context, at least one guide element, which protrudes on the outer lateral surface of the nozzle head, is additionally obtained that guides at least a part of the air flow radially inwards (to a greater extent) into an injection region, which is central in the injection direction, downstream of the nozzle exit opening during operation of the engine. Therefore, a part of the air flow of the air-guiding duct is deflected radially inwards via the at least one guide element on the nozzle head. In the process, the partial air flow can also be slowed down in the circumferential direction, with the result that less rotational energy is inherent to the partial air flow and thus this part (which is guided radially inwards to a greater extent) of the air flow from the air-guiding duct is less swirl-affected than other parts of the air flow conducted out of the air-guiding duct in the direction of the combustion space. That part of the air flow that is deflected at the at least one guide element thus has a more significant movement component in an axial direction and in the process is conducted directly into the injection region downstream of the nozzle exit opening, with the result that this makes it possible to effectively counteract a backflow of hot gases in the direction of the nozzle exit opening and thus at the nozzle head. The backflow of hot gases at the nozzle head can thus be selectively avoided, specifically by way of at least one guide element formed on the nozzle head itself.

In this respect, the swirl-affected air flow is applied to the nozzle head from the at least one air-guiding duct at an angle in relation to the nozzle longitudinal axis. The air-guiding duct thus allows an already selectively swirled air flow to flow out of an exit opening of the air-guiding duct in the direction of the nozzle head, with the result that the air flow impinges on the outer lateral surface of the nozzle head along a flow direction which is not parallel to the nozzle longitudinal axis. The non-parallel flow direction along which the air flow impinges on the lateral surface thus includes a directional component perpendicular to the nozzle longitudinal axis. In particular, it may be provided that the at least one guide duct and the nozzle head are designed and arranged in relation to one another in such a way that the swirl-affected air flow flows out of the air-guiding duct in the direction of the lateral surface of the nozzle head at an angle in relation to the nozzle longitudinal axis in the range of 40° to 90°, in particular in the range of 70° to 90°, or at an angle in relation to the nozzle longitudinal axis of substantially or exactly 90°, during operation of the engine, and then at least a part of this air flow is guided over the lateral surface in the direction of the nozzle exit opening.

This guide element may therefore be configured to deflect the one part of the air flow from an air-guiding duct radially inwards on the lateral surface of the nozzle head and to slow it down in the circumferential direction (during operation of the combustion chamber, or of the engine). Variables of the guide element, in particular the protrusion of the guide element on the lateral surface and the extent of the guide element and also its positioning on the outer lateral surface relative to the air-guiding duct can be predefined here in such a way that specifically a part of the air flow of the air-guiding duct is deflected to the injection region downstream of the nozzle exit opening and, in this respect, less swirl is inherent to this part of the air flow owing to the deflection.

In principle, the guide element may be formed on the outer lateral surface of the nozzle head (and thus, for example, shaped jointly thereon) or may, in the form of a separate component, be fixed to it. As an alternative or in addition, the at least one air-guiding duct may have an annular cross section and extend in the circumferential direction around the nozzle head.

In one embodiment variant, the guide element has an elongate form. This in particular includes the guide element protruding in a straight line on the outer lateral surface. However, a profile which is curved in certain portions is also possible. As an alternative or in addition, the guide element may be formed with a cross-sectional area which is constant along its longitudinal extent, in particular is rectangular. As an alternative, the guide element may be formed with a cross-sectional area that tapers along its direction of longitudinal extent in the direction of a nozzle end.

In one embodiment variant, the guide element extends along the outer lateral surface of the nozzle head by way of a minimum length, which corresponds to at least half, in particular at least ⅔, of the length, measured along the nozzle longitudinal axis, of the nozzle head.

As an alternative or in addition, the guide element may be in the form of a fin or rib.

To comprehensively influence the air flow of the air-guiding duct on the nozzle head more easily, multiple guide elements may be provided on the nozzle head. These guide elements are then provided distributed, for example provided evenly distributed, on the outer lateral surface along a circumferential direction about the nozzle longitudinal axis. In particular, the guide elements may be arranged equidistantly from one another in this respect.

When there are multiple guide elements, each guide element may extend along the outer lateral surface in a plane of extent which is parallel in relation to the nozzle longitudinal axis. All the guide elements consequently lie in one of multiple planes of extent which are parallel to the nozzle longitudinal axis, wherein all the planes of extent intersect along the nozzle longitudinal axis. In an embodiment variant of this type, the guide elements consequently are not inclined in relation to the injection direction, but optionally only with a inclination radially inwards in relation to the nozzle longitudinal axis (for example, in the case of a nozzle head which tapers towards the nozzle end).

In an alternative embodiment variant, each guide element extends along the outer lateral surface in a plane of extent which is inclined (at an angle of greater than 0° and less than) 90° in relation to the nozzle longitudinal axis. Here, consequently, all the guide elements are slanted in relation to the nozzle longitudinal axis, i.e. they are inclined in the circumferential direction on the lateral surface and thus oblique in relation to the injection direction. This in particular includes the guide elements being inclined both radially inwards and in relation to the circumferential direction. The inclination provided in the circumferential direction may in this respect in principle have the opposite alignment to the swirl with which the air from the air-guiding duct impinges on the lateral surface of the nozzle head and in particular the guide elements.

In one refinement with guide elements that are oblique in relation to the injection direction, the guide elements may run at an angle of attack in the range of 1° to 75°, in particular in the range of 5° to 75°, 5° to 70°, 8° to 65° or 10° to 50°.

In principle, the nozzle head may have a tapering form towards the nozzle end. Thus, the nozzle head, by way of its outer lateral surface, tapers along the nozzle longitudinal axis to a nozzle end.

For example, the nozzle head may have a conical or frustoconical form. A conical or frustoconical form of the nozzle head is, of course, not imperative. In principle, the nozzle head may also have another, arbitrary and in particular axially symmetrical basic shape. For example, the nozzle head may have a hemispherical form or have a basic shape which constitutes a mixture of a sphere and a cone. With regard to an axially symmetrical basic shape, it should also be pointed out that, in this context, axially symmetrical does not mean that the nozzle head has a circular basic area transversely to the nozzle longitudinal axis. Accordingly, the nozzle head may also have the form of a truncated pyramid or truncated tetrahedron. A basic shape with more facets is also possible.

The proposed solution also comprises an engine having at least one embodiment variant of a proposed nozzle assembly.

The appended figures depict possible embodiment variants of the proposed solution by way of example.

IN THE FIGURES

Figure 6A:
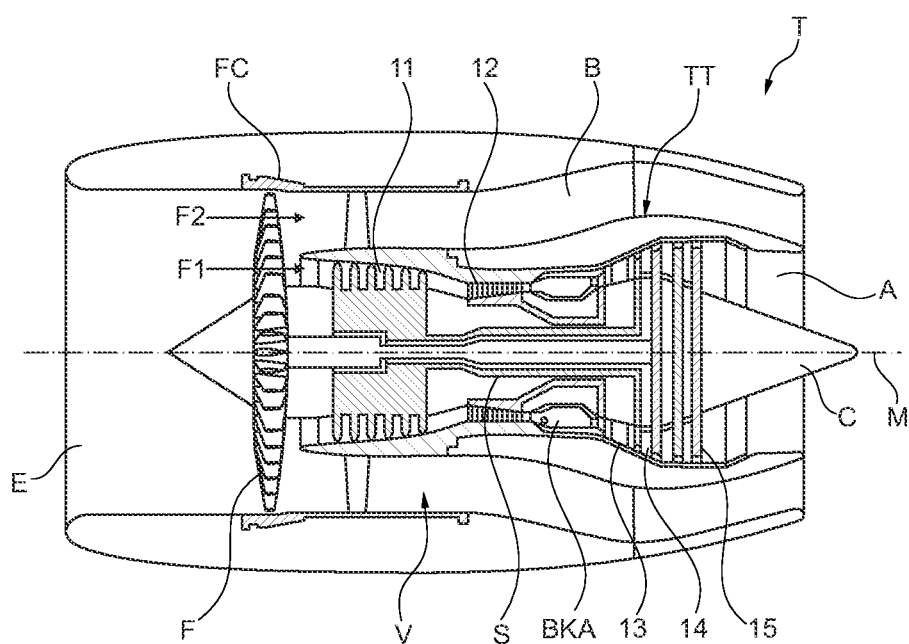
FIG. 6A shows an engine in which an embodiment variant of a proposed nozzle assembly is used.

FIG. 6A depicts, schematically and in a sectional illustration, a (turbofan) engine T in which the individual engine components are arranged one behind the other along an axis of rotation or central axis M, and the engine T is in the form of a turbofan engine. At an inlet or intake E of the engine T, air is drawn in along an inlet direction by means of a fan F. This fan F, which is arranged in a fan casing FC, is driven by means of a rotor shaft S which is set in rotation by a turbine TT of the engine T. The turbine TT here adjoins a compressor V, which has, for example, a low-pressure compressor 11 and a high-pressure compressor 12, and optionally also a medium-pressure compressor. On the one hand, the fan F conducts air in a primary air flow F1 to the compressor V, and, on the other hand, to generate thrust, in a secondary air flow F2 to a secondary flow duct or bypass duct B. The bypass duct B here runs around a core engine comprising the compressor V and the turbine TT and comprising a primary flow duct for the air supplied to the core engine by the fan F.

The air conveyed into the primary flow duct by means of the compressor V enters a combustion chamber assembly BK of the core engine, in which the drive energy for driving the turbine TT is generated. For this purpose, the turbine TT has a high-pressure turbine 13, a medium-pressure turbine 14 and a low-pressure turbine 15. Here, the energy released during the combustion is used by the turbine TT to drive the rotor shaft S and thus the fan F in order to generate the required thrust by means of the air conveyed into the bypass duct B. Both the air from the bypass duct B and the exhaust gases from the primary flow duct of the core engine flow out via an outlet A at the end of the engine T. Here, the outlet A commonly has a thrust nozzle with a centrally arranged exit cone C.

Figure 6B:
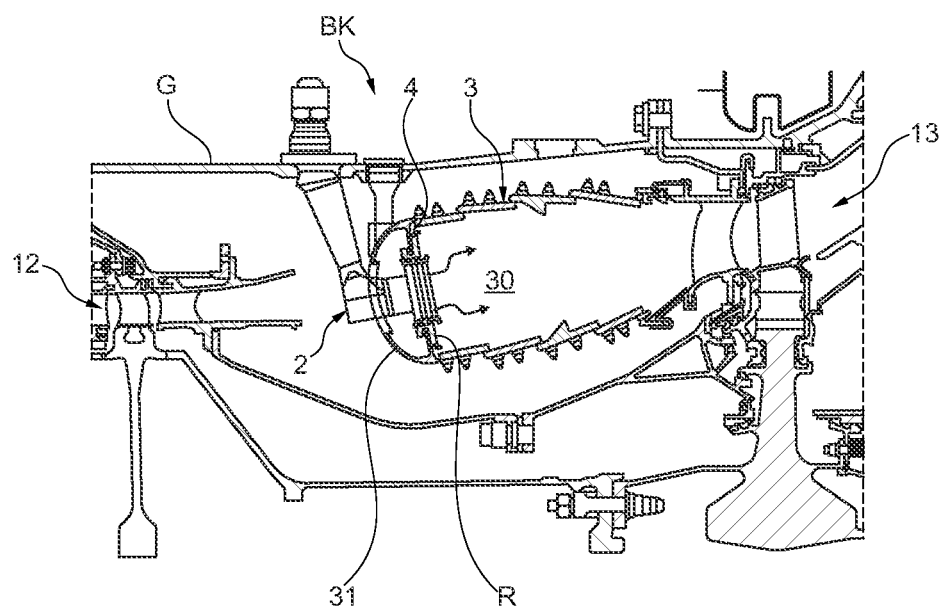
FIG. 6B shows an enlarged scale of a detail of the combustion chamber of the engine of FIG. 6A.

FIG. 6B shows a longitudinal section through the combustion chamber assembly BK of the engine T. This shows in particular an (annular) combustion chamber 3 of the engine T. A nozzle assembly is provided for the injection of fuel or an air-fuel mixture into a combustion space 30 of the combustion chamber 3. Said nozzle assembly comprises a combustion chamber ring R on which multiple nozzles 2 are arranged at a combustion chamber head 31 of the combustion chamber along a circular line around the centre axis M. One or more combustor seals 4 with mounting openings at which nozzle heads of the respective nozzles 2 are held are provided on the combustion chamber ring R, with the result that fuel can be injected into the combustion chamber 3 thereby. Here, each nozzle 2 comprises a flange by way of which a nozzle 2 is screwed to an outer casing G of the combustion chamber 3.

Figure 1:
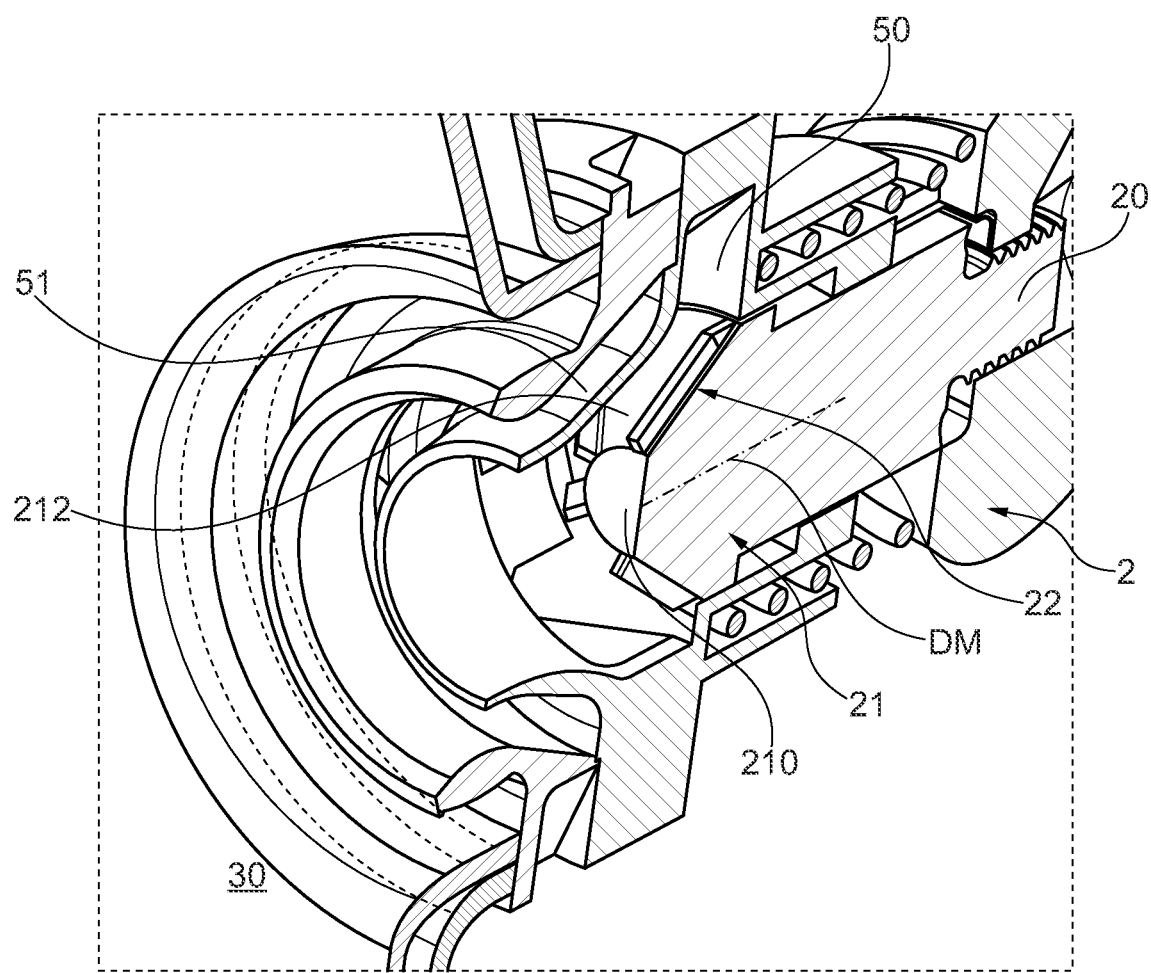
FIG. 1 shows a perspective view, in partial section, of an embodiment variant of a proposed nozzle assembly as seen from the combustion space.

FIG. 1 depicts, on an enlarged scale, the structure of an embodiment variant of a proposed nozzle assembly with a nozzle 2, on the nozzle head 21 of which multiple guide elements 22 that protrude in a fin-like or rib-like manner and are intended for influencing a swirled air flow are provided. Here, the nozzle 2 of FIG. 1 is in the form of the atomizer nozzle, in order to inject fuel into the combustion space 30 of the combustion chamber 3 of FIGS. 6A and 6B. Thus, the atomized fuel is introduced into the combustion space 30 at relatively high speed at a nozzle exit opening 210 of the nozzle head 21. In this respect, the nozzle head 21 adjoins a nozzle main body 20 of the nozzle 2 along a nozzle longitudinal axis DM.

Air-guiding ducts 50 and 51 are provided radially further to the outside in relation to the nozzle longitudinal axis DM on the nozzle assembly 2 illustrated. Air flows in towards the combustion space 30 by way of these air-guiding ducts 50 and 51. In the process, the (combustion) air introduced into the combustion space 30 by way of the air-guiding ducts 50 and 51 is selectively swirled in order to radially delineate, downstream of the nozzle exit opening 210, an injection cone 2A, visible in the sectional illustration of FIG. 2, for the injected fuel by means of an eddy current 5A and to provide a recirculation zone Z downstream of the nozzle head 21, which recirculation zone, when the fuel-air mixture is being combusted, is advantageous for the stability of the resulting flame. Here, a first air-guiding duct 50 lies between the nozzle head 21 and a second air-guiding duct 51 which is radially further to the outside. In this respect, in the present case the first air-guiding duct 50 ends in the region of the nozzle head 21 of the nozzle 2, with the result that a part of the air flow coming from the first air-guiding duct 50 is guided along an outer lateral surface 212 of the nozzle head 21, which tapers towards the nozzle end (and is frustoconical here).

In the present case, the swirl-affected air flow is applied to the nozzle head 21 from the first air-guiding duct 50 at an angle of substantially 90° in relation to the nozzle longitudinal axis DM. A part of the air flow from the first air-guiding duct 50 thus impinges on the lateral surface 212 of the nozzle head 21 in a radially inward direction at an angle of substantially 90° and is thus deflected at this lateral surface 212 and guided along it in the direction of the nozzle exit opening. This deflected part of the air flow then flows into the combustion space 30 substantially free of swirl. The non-deflected part of the air flow continues to be swirl-affected, with the result that a radially inner air flow flows into the combustion space 30 in a manner free of swirl and a radially outer air flow flows into the combustion space in a swirl-affected manner.

Figure 3A:
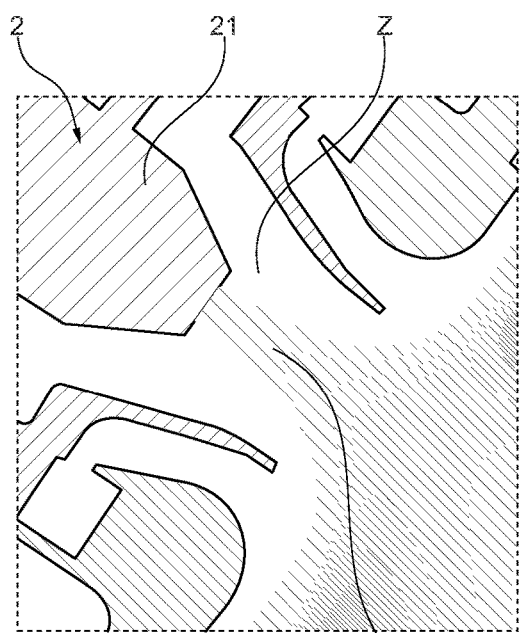
FIG. 3A shows a nozzle assembly, during operation of a combustion chamber of the engine, having a nozzle head on which no guide elements according to the proposed solution are provided, with depiction of a backflow of hot gas in the direction of the nozzle head.

In the case of nozzle assemblies customary to date, under certain circumstances it can be observed that, on account of the swirl-affected air flows from the air-guiding ducts 50 and 51, a backflow RS of hot gas arises in the direction of the nozzle end, and here in particular as far as the nozzle head 21 of the nozzle 2. This backflow RS is therefore in particular aligned opposite to an injection direction ER for the atomized fuel, which is parallel to the nozzle longitudinal axis DM and along which the fuel is injected into the combustion space 30. As depicted in particular with reference to the illustration of FIG. 3A, as a result of the backflow RS it is possible in particular that hot gases and combustion products reach the nozzle head 21 and thus lead to undesirable heating of the nozzle head 21 at the nozzle end. In the extreme case, this heating can even lead to destruction of the nozzle head 21.

Figure 2:
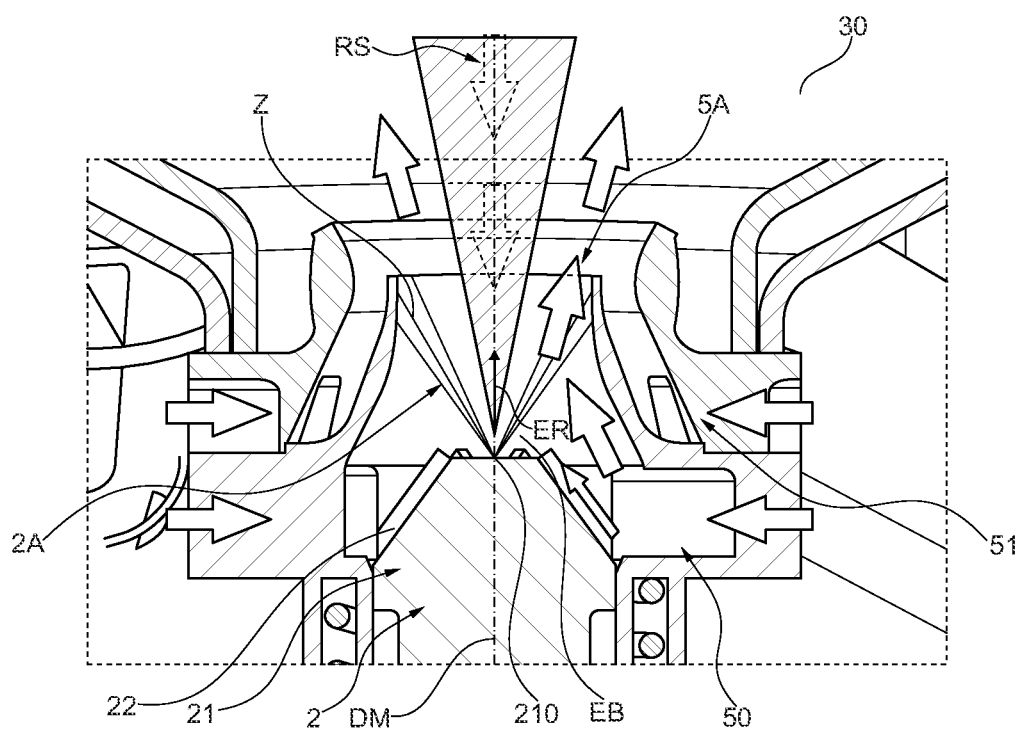
FIG. 2 shows a sectional illustration of the nozzle assembly of FIG. 1.

As part of the proposed solution, in the embodiment variant of the nozzle assembly of FIGS. 1 and 2, in this regard an improvement is achieved in that a multiplicity of guide elements 22 evenly distributed over the circumference is provided on the outer lateral surface 212 of the nozzle head 21. Here, these guide elements 22 respectively protrude on the lateral surface 212 in a fin-like or rib-like manner and have an elongate form and run in the direction of the nozzle end. Each guide element 22 is in the flow path of the air flow coming from the first air-guiding duct 50. Thus, at these guide elements 22, at least a part of the air flow coming from the first air-guiding duct 50 is guided along a lateral surface of the respective guide element 22 and thus selectively deflected in the direction of a central injection region EB which is directly downstream of the nozzle exit opening 210. The guide elements 22 on the nozzle head 21 thus lead to a straightened partial air flow in the direction of the central nozzle longitudinal axis DM behind the nozzle head 21. This partial air flow is aligned in the injection direction ER substantially free of swirl and thus effectively counteracts a backflow RS and in particular prevents the triggering of a backflow RS by way of which hot gases are conducted as far as the nozzle head 21.

Figure 3B:
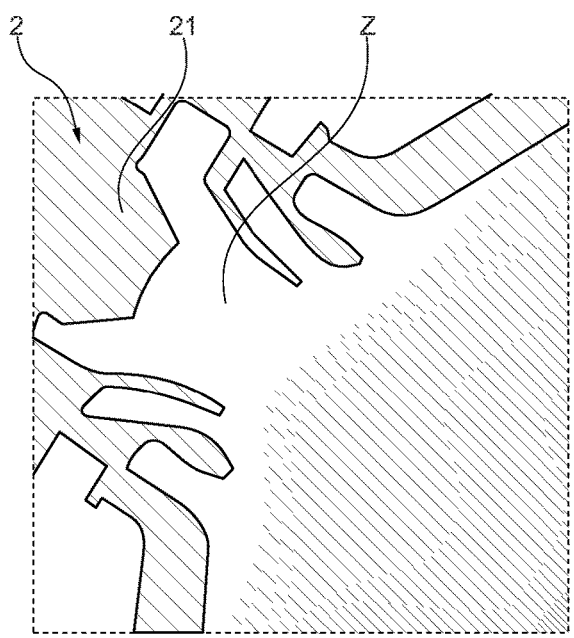
FIG. 3B shows, in a view corresponding to FIG. 3A, the resulting hot flow in the case of a nozzle assembly according to the proposed solution.

This is also depicted in more detail in the illustration of FIG. 3B, which is based on experimental data. In the recirculation zone Z directly downstream of the nozzle 2 designed according to FIGS. 1 and 2, hot combustion gases no longer come back as far as the nozzle head 21.

Figure 4:
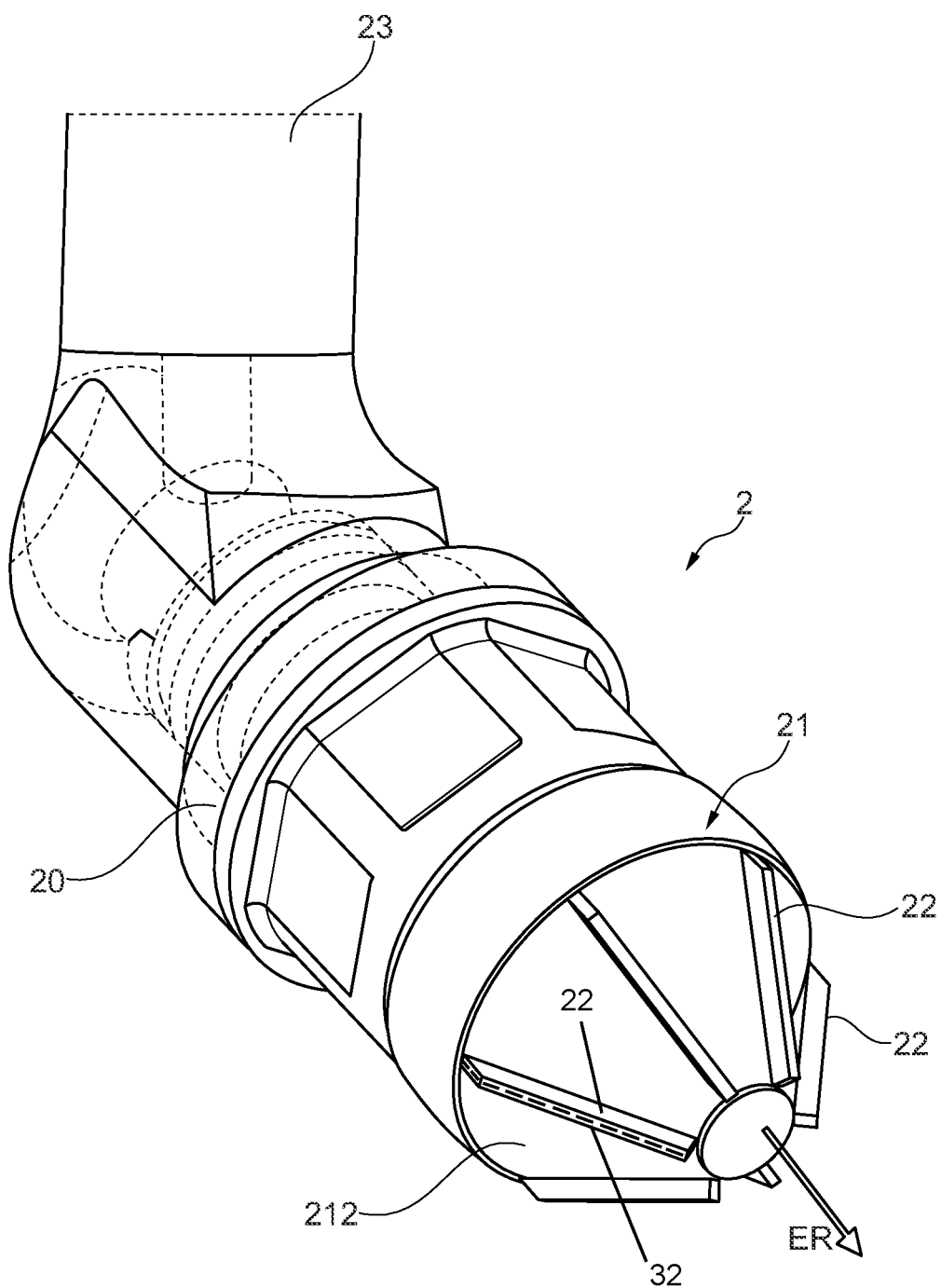
FIG. 4 shows an individual view, in perspective, of a nozzle of the embodiment variant of FIGS. 1, 2 and 3B.

The arrangement of the multiplicity of guide elements 22 on the lateral surface 212 of the frustoconical nozzle head 21 is depicted once again in FIG. 4, in which the nozzle 2 is illustrated on its own in a perspective view. Here, the nozzle head 21 adjoins the nozzle main body 20, which is connected to a nozzle stem 23 of the nozzle 2, along the nozzle longitudinal axis DM. The nozzle stem 23 establishes the connection to a fuel supply on the engine side and is secured to the flange via which the nozzle 2 is fixed to the outer casing G of the combustion chamber 3. In the case of the nozzle 2 of FIG. 4, the individual guide elements 22 each run in a straight line and extend over the majority of the length, measured along the nozzle longitudinal axis DM, of the nozzle head 21, here at least over ⅔ of the length of the nozzle head 21. Owing to the conical tapering of the nozzle head 21 towards the nozzle end, and thus the corresponding profile of the outer lateral surface 212, the individual protruding guide elements 22 follow the profile of the lateral surface 212 and each extend at an inclination in relation to the nozzle longitudinal axis DM. Each guide element 22, which in the present case has a rectangular cross section, here consequently extends in a virtual plane of extent parallel to the nozzle longitudinal axis DM.

Figure 5:
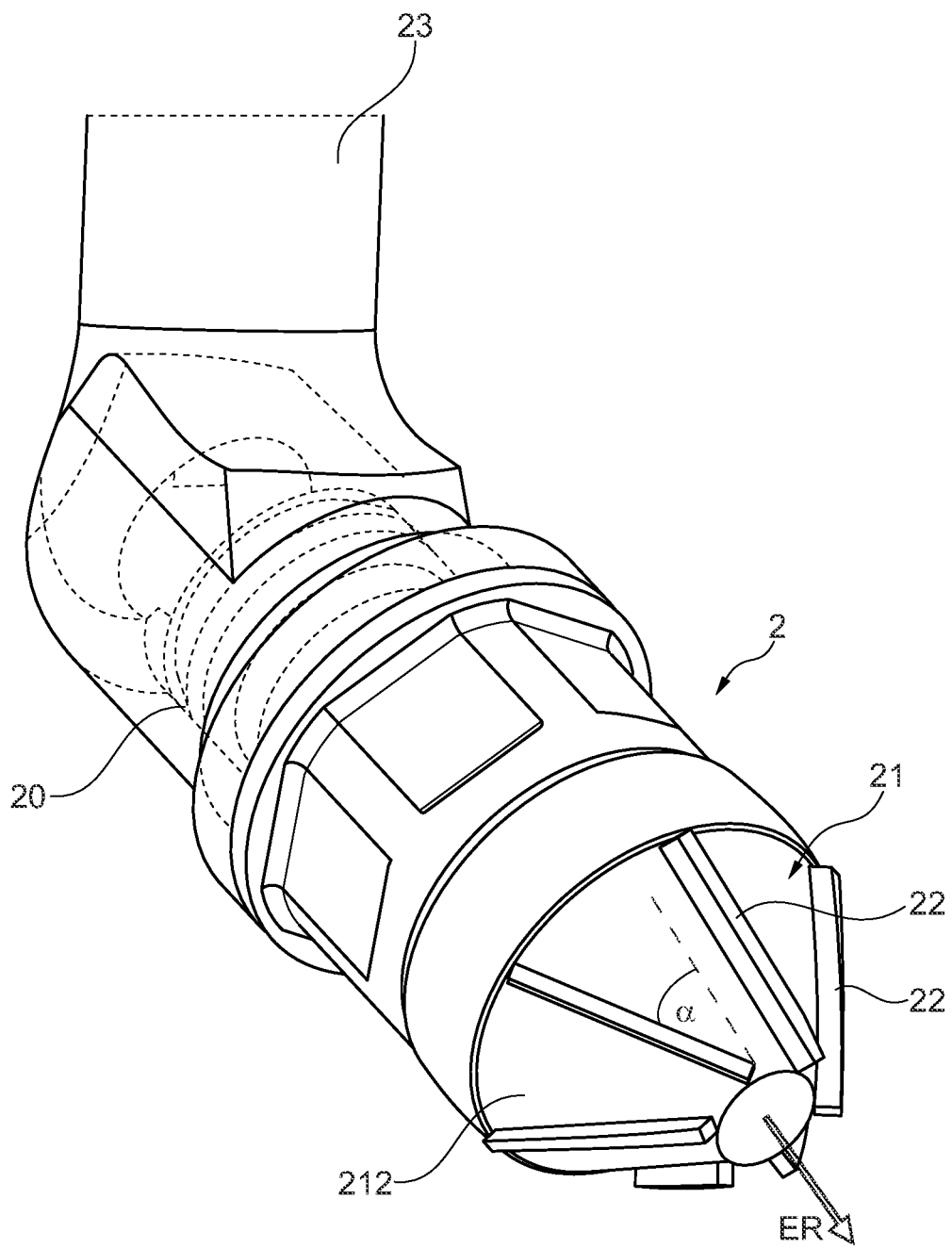
FIG. 5 shows, in a view corresponding to FIG. 4, a nozzle of a further embodiment variant, in which guide elements are provided slanted on the nozzle head and thus obliquely in relation to the injection direction.

By contrast, although the guide elements 22 of one embodiment variant of the nozzle 2 are spaced apart equidistantly from one another, like in the embodiment variant of FIG. 4, as per FIG. 5 they are slanted. Here, consequently, although each guide element 22 still runs in a straight line protruding on the outer lateral surface 212, they are inclined in the circumferential direction. The guide elements 22 of the nozzle 2 of FIG. 5 are therefore oblique in relation to the injection direction ER and have an inclination both in relation to the nozzle longitudinal axis DM and in the circumferential direction. For example, each guide element 22 runs on the outer lateral surface 212 at an angle of attack α in the range of 10° to 40°.

It is self-evident that the proposed solution is not limited to the exemplary embodiments described above, and various modifications and improvements can be made without departing from the concepts described here. Any of the features may be used separately or in combination with any other features, unless they are mutually exclusive, and the disclosure extends to and includes all combinations and subcombinations of one or more features which are described here.

LIST OF REFERENCE SIGNS

11 Low-pressure compressor
12 High-pressure compressor
13 High-pressure turbine
14 Medium-pressure turbine
15 Low-pressure turbine
2 Nozzle
20 Nozzle main body
21 Nozzle head
210 Nozzle exit opening
212 Lateral surface
22 Guide element
23 Nozzle stem
2A Injection cone
3 Combustion chamber
30 Combustion space
31 Combustion chamber head
4 Combustor seal
50, 51 Air-guiding duct for creating radially external air eddy currents
5A Eddy current
A Outlet
B Bypass duct
BK Combustion chamber assembly
C Outlet cone
DM Nozzle longitudinal axis
E Inlet/Intake
EB Injection region
ER Injection direction
F Fan
F1, F2 Fluid flow
FC Fan casing
G Outer casing
M Centre axis/Axis of rotation
R Combustion chamber ring
RS Backflow
S Rotor shaft
T (Turbofan) engine
TT Turbine
V Compressor
Z Recirculation zone
α Angle of attack

The invention claimed is:

1. A nozzle assembly for a combustion chamber of an engine, comprising:
at least one nozzle including a nozzle head that extends along a nozzle longitudinal axis, and the nozzle head includes at least one nozzle exit opening and an outer lateral surface, wherein the at least one nozzle exit opening is coaxial with the nozzle longitudinal axis for injecting fuel into a combustion space of the combustion chamber, and the outer lateral surface tapers radially inward as the nozzle head extends along the nozzle longitudinal axis, and
at least one air-guiding duct including an entrance and a flow path downstream from the entrance, the at least one air-guiding duct configured to create a swirl-affected air flow swirled in a circumferential direction relative to the nozzle longitudinal axis at the entrance, and the swirl-affected air flow flowing through the flow path along the outer lateral surface of the nozzle head is conducted out of the at least one air-guiding duct and is discharged into the combustion space;
at least one guide element radially extending from the outer lateral surface of the nozzle head relative to the nozzle longitudinal axis and being aligned with the nozzle longitudinal axis, the at least one guide element being positioned in the flow path of the at least one air-guiding duct and being configured to guide a first portion of the swirl-affected air flow radially inward relative to the nozzle longitudinal axis into a central injection region downstream of the at least one nozzle exit opening;
wherein the at least one guide element is configured to deflect the first portion of the swirl-affected air flow radially inward relative to the nozzle longitudinal axis on the outer lateral surface of the nozzle head, and slow down the first portion of the swirl-affected air flow in the circumferential direction, in order to reduce rotational energy of the first portion of the swirl-affected air flow and reduce swirl of the first portion of the swirl-affected air flow in the circumferential direction as compared to a second portion of the swirl-affected air flow conducted out of the at least one air-guiding duct and discharged into the combustion space;
wherein the entrance of the at least one air-guiding duct extends radially inward relative to the nozzle longitudinal axis and defines an entrance axis, and the entrance axis intersects the outer lateral surface of the nozzle head, such that the swirled-affected air flow created at the entrance directly impinges onto the outer lateral surface of the nozzle head;
wherein the at least one guide element radially extends freely from the outer lateral surface of the nozzle head, such that a radially outer surface of the at least one guide element is freely exposed to the second portion of the swirl-affected air flow.

2. The nozzle assembly according to claim 1, wherein the at least one guide element has an elongate form.

3. The nozzle assembly according to claim 1, wherein the at least one guide element extends along the nozzle longitudinal axis on the outer lateral surface of the at least one nozzle head for at least half of a length of the at least one nozzle head as measured along the nozzle longitudinal axis.

4. The nozzle assembly according to claim 1, wherein the at least one guide element is formed as a fin or a rib.

5. The nozzle assembly according to claim 1, wherein the at least one guide element includes a plurality of guide elements, and the plurality of guide elements are positioned on the outer lateral surface of the at least one nozzle head in the circumferential direction relative to the nozzle longitudinal axis.

6. The nozzle assembly according to claim 5, wherein the plurality of guide elements positioned on the outer lateral surface of the at least one nozzle head are evenly distributed in the circumferential direction relative to the nozzle longitudinal axis.

7. The nozzle assembly according to claim 1, wherein the at least one nozzle head has a conical or frustoconical form.

8. An engine including at least one of the nozzle according to claim 1.

* * * * *